United States Patent
Pathak

(10) Patent No.: US 7,623,721 B1
(45) Date of Patent: Nov. 24, 2009

(54) HIGH-SPEED DITHERING ARCHITECTURE

(75) Inventor: Bharat Pathak, Bangalore (IN)

(73) Assignee: Marvell International Ltd., Hamilton (BM)

( * ) Notice: Subject to any disclaimer, the term of this patent is extended or adjusted under 35 U.S.C. 154(b) by 677 days.

(21) Appl. No.: 11/296,035

(22) Filed: Dec. 7, 2005

(51) Int. Cl.
*G06K 9/36* (2006.01)
*H04N 1/40* (2006.01)
*G09G 5/02* (2006.01)

(52) U.S. Cl. .................. 382/251; 358/3.13; 345/596
(58) Field of Classification Search .......... 382/251, 382/252, 260–264, 266, 274, 275, 323, 305, 382/312; 358/1.9, 3.03, 3.04, 3.13, 3.14, 358/3.15, 3.16; 345/596, 597, 616; 375/240.03
See application file for complete search history.

(56) References Cited

U.S. PATENT DOCUMENTS

| | | | |
|---|---|---|---|
| 6,307,647 B1 * | 10/2001 | Cheung et al. | 358/3.04 |
| 6,552,823 B1 * | 4/2003 | Chang | 358/3.03 |
| 6,671,068 B1 * | 12/2003 | Chang et al. | 358/1.9 |
| 6,678,073 B1 * | 1/2004 | Jewitt | 358/3.04 |
| 6,977,663 B2 * | 12/2005 | Chang | 345/596 |
| 6,993,154 B2 * | 1/2006 | Brunk | 382/100 |
| 7,038,814 B2 * | 5/2006 | Huovinen | 358/1.9 |
| 7,043,089 B2 * | 5/2006 | Ballard | 382/237 |
| 7,171,019 B2 * | 1/2007 | Miyake et al. | 382/100 |
| 7,339,706 B2 * | 3/2008 | Ohta | 358/3.03 |

* cited by examiner

*Primary Examiner*—Kanji Patel

(57) ABSTRACT

A filter for implementing Floyd Steinberg two-dimensional error diffusion algorithms allows high-speed processing of video and images. The filter is shown in direct form with proper bit precision with implementations that permit the filter to operate at high speed. Furthermore, a reduction in the gate count is achieved over the direct form. The results of static timing analysis obtained post synthesis are also summarized.

20 Claims, 4 Drawing Sheets

HIGH-SPEED DITHERING ARCHITECTURE

FIELD OF THE INVENTION

The present invention relates generally to image and video processing, and more particularly to dithering.

BACKGROUND OF THE INVENTION

Dithering (also known as color quantization or error diffusion) is used in image and video processing. Dithering is often used when an image with high resolution (e.g., 24-bit RGB words having eight bits per color) is converted to image with lower resolution (e.g., 18-bit RGB words with six bits per color). When the conversion is performed by (for example) discarding the lowest 2-bits of a pixel, contouring artifacts often result, especially in smoothly graded regions. Dithering is helpful in reducing contouring artifacts that are often caused by simple quantization techniques.

Different types of dithering can be used to reduce contouring artifacts. Some of the different kinds of dithering include the use of ordered mask values, blue noise mask-based dithering, and error diffusion to neighboring pixels. The dithering can be applied to images from photographs, video sources, and the like.

The process of color quantization involves reducing the number of colors available in a color used in an image. For example, a 24-bit RGB color palette contains around 16.7 million colors. When an 18-bit RGB color palette is generated, the generated color palette contains around 262,000 colors. Dithering techniques appear to reduce the contouring artifacts by taking advantage of certain human visual characteristics. The methods for dithering add high frequency noise to the image such that the noise by itself is not typically visible from distance, but that the average effect of noise addition results in a reduction of the contouring artifacts. At the same time, these techniques work to create the appearance of colors being present from the original color palette in the quantized image.

Floyd and Steinberg dithering is widely used in digital halftoning of intensity images for printing applications. The same concept is also applied for dithering of color images. Dithering of color images is normally used where some conventional display and printing devices do not have the capability to reproduce a true-color (16.7 million colors) image. Such devices often lack the ability to reproduce a true-color image because 6 bit row and column drivers usually cost much less than 8 bit row and column drivers. Accordingly, the last two bits of information are discarded by means of appropriate dithering technique before the truncated image data is sent to the display device. Because color quantization is performed just before the data is sent to row and column drivers of displays, the color quantization is performed at a rate that is suitable for the row and column drivers.

An appreciation of the present invention and its improvements can be obtained by reference to the accompanying drawings, which are briefly summarized below, to the following detailed description of illustrated embodiments of the invention, and to the appended claims.

DETAILED DESCRIPTION OF THE PREFERRED EMBODIMENT

Figure 1:
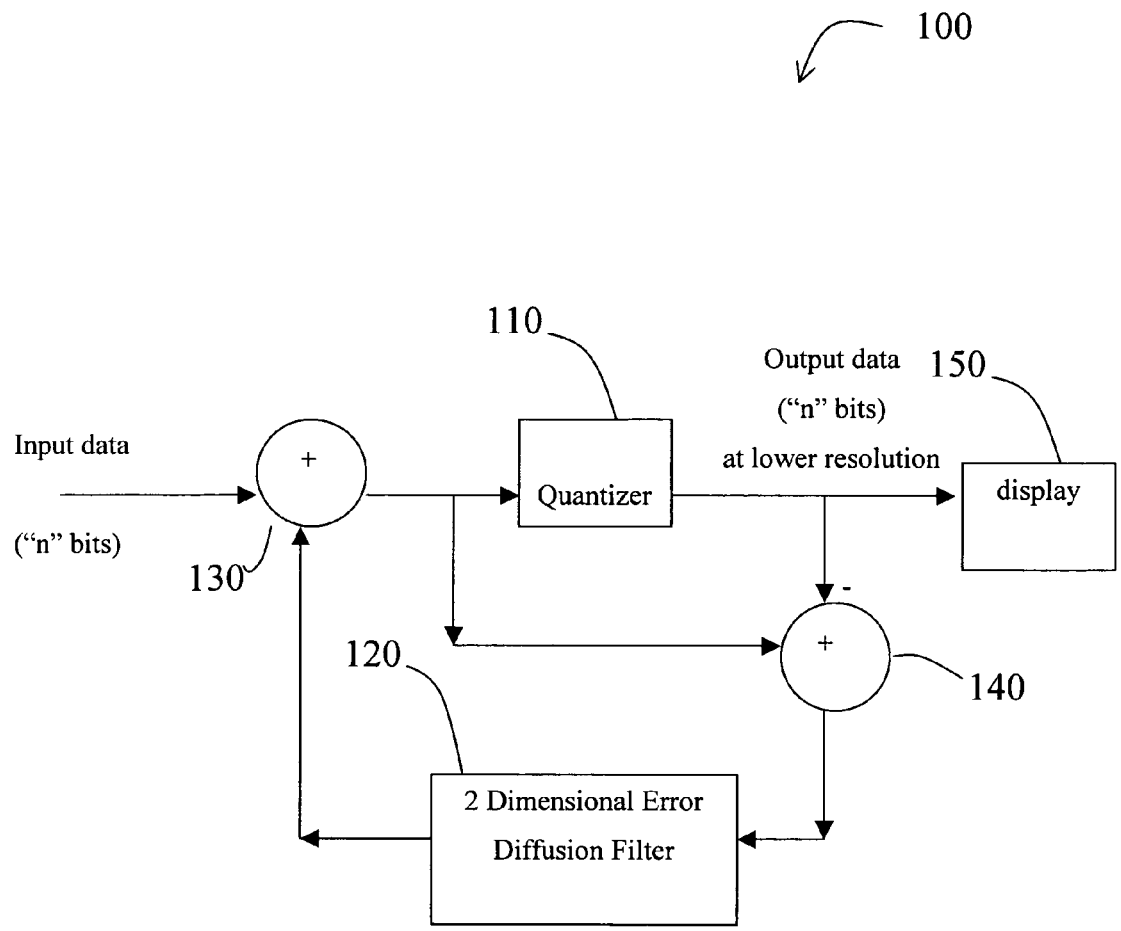
FIG. 1 is a block diagram of error diffusion-based color quantization in accordance with the present invention.

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected, or an indirect connection through one or more passive or active intermediary devices. The term "circuit" means either a single component or a multiplicity of components, either active and/or passive, that are coupled together to provide a desired function. The term "signal" means at least one current, voltage, or data signal. Referring to the drawings, like numbers indicate like parts throughout the views.

The present invention is directed to present a high-speed architecture for implementing Floyd Steinberg two-dimensional error diffusion algorithms. The high-speed two-dimensional filter is suitable for video and image processing. The filter is shown below in direct form with proper bit precision and with implementations that permit the filter to operate at high speed. Furthermore, a reduction in the gate count is achieved over the direct form. The results of static timing analysis obtained post-synthesis are also summarized.

FIG. 1 is a block diagram of error diffusion-based color quantization in accordance with the present invention. Error diffusion-based color quantizer 100 comprises quantizer 110, two-dimensional error diffusion filter 120, summing nodes 130 and 140, and display 150.

In operation, the incoming data is quantized. For example, 10 bits of Red or Green or Blue (RGB) color values are quantized to either eight bits of precision or 6 bits of precision at the output. In the case of quantization to eight bits, the bottommost (i.e., two LSBs) bits of output have a "00" value. In the case of output precision being six bits, bottommost four (LSBs) bits have a "0000" value. The incoming bits of input data are presented to a first input of summing node 130.

A second input of summing node 130 receives values produced by an error diffusion filter. In an embodiment, the filter is a two-dimensional filter in accordance with the following filter coefficients, $$\left\{ \frac{\begin{vmatrix} 1 & 5 & 3 \\ 7 & X & 0 \end{vmatrix}}{16} \right\}$$

where "X" represents a current pixel of interest. Because the filter coefficients are constants, the multipliers in the filter are implemented using binary shift and add operations. Summing node 130 adds the two input streams and presents the results to quantizer 110 and to the summing node 140.

Quantizer 110 reduces the effective bit width of the added data. In an embodiment, quantizer 110 is truncation-based (as compared to a rounding-based quantizer). Truncation-based quantization decreases hardware requirements and helps the design to work at high frequencies. In the truncation system of the embodiment, the bottom four bits of the quantizer output (for output resolution of six bits) or two bits (for output resolution of eight bits) often result in quantization errors, which are sent directly to the error diffusion filter.

The resulting quantization error typically has a flat magnitude response in frequency domain (for an open loop case), which in turn is shaped by the filter in the feedback path (which begins at the output node of summing node 140. The filtering in the feedback path results in "high pass" shaping of the quantization error. The high pass shaping of quantization noise is also referred as "blue noise." The shaped noise (i.e., the error diffusion filter output) is then diffused back to the adjacent incoming pixels. Thus, the noise shaping and diffusion results in effective removal of contouring artifacts when the output of the quantizer 110 is presented to display 150.

Figure 2:
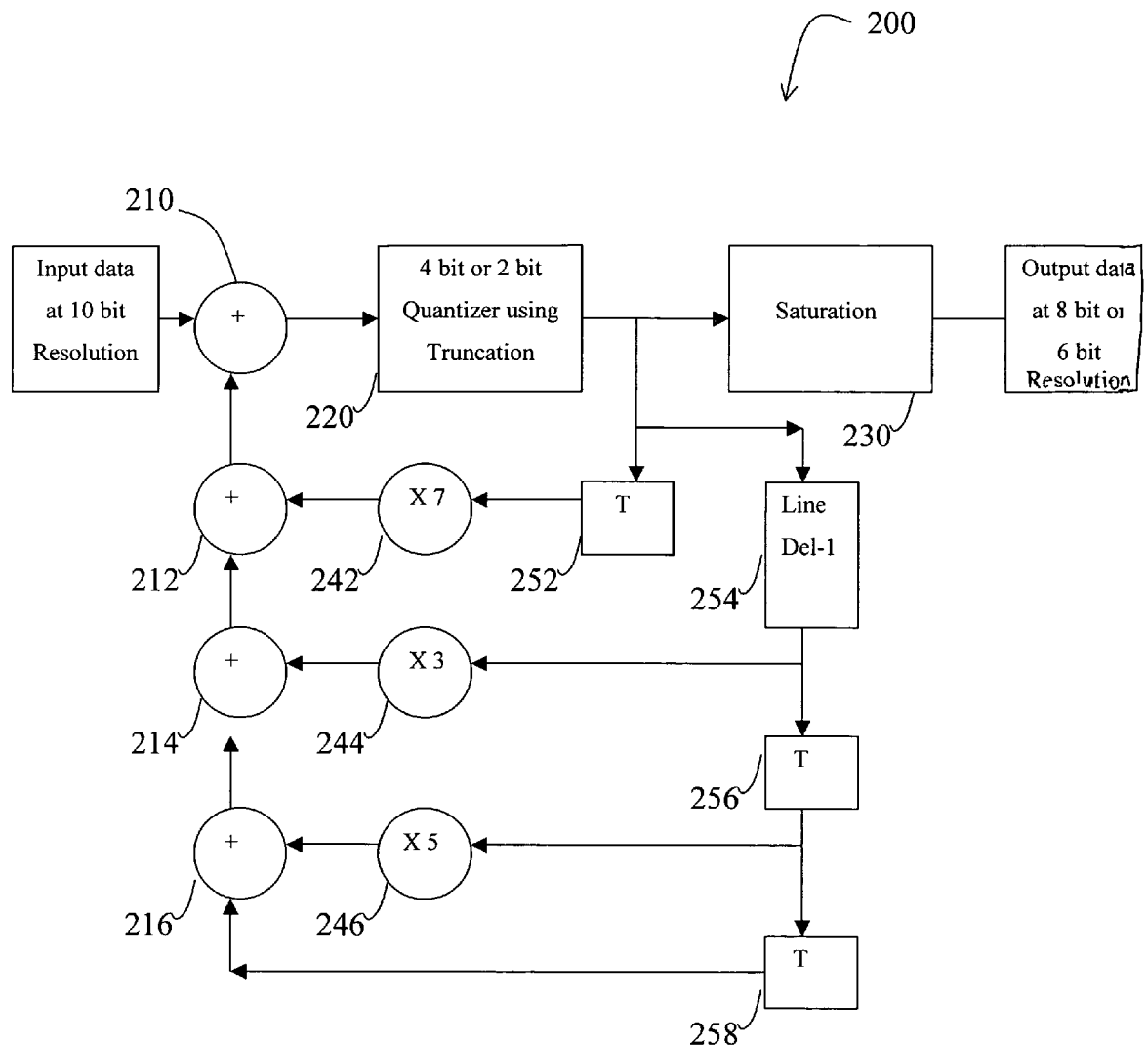
FIG. 2 is a block diagram of a two-dimensional Floyd Steinberg filter in direct form in accordance with the present invention.

FIG. 2 is a block diagram of a two-dimensional Floyd Steinberg filter in direct form in accordance with the present invention. Quantization filter 200 comprises quantizer 220, saturation block 230, summing nodes 210, 212, 214, 216, shift- and add-based multipliers 242, 244, 246, unit delays 252, 256, 258, and line delay 254.

The dithering structure 200 shown in FIG. 2 is a direct form of implementation. In the embodiment, the input is at a 10-bit resolution level and the output is also at a 10-bit level, with the output resolution at eight bits or six bits, depending on how much quantization is selected. The quantization error (i.e., the LSBs of the quantizer) is fed to the error diffusion filter. Because the error diffusion filter is 2-dimensional, an additional line delay is used. The line delay is of word-length, which is typically equal to the horizontal resolution of image. For example, in high definition TV standards, a standard one line of active data comprises 1920 pixels.

In an embodiment, the memory selected for implementing the line delay is a single port RAM. However, the functionality of a dual port memory is implemented in order to write the quantization error values as well as to read one line-delayed versions from the same location in the same clock. But since a dual port RAM consumes more than twice the layout area of single port RAM, a single port RAM is used.

The behavior of dual port memory is emulated in the embodiment by writing two data words in one clock cycle and reading two data words in another clock cycle. This can be done by reducing the depth of the memory by a factor of two while doubling the width of the memory. In an example application, a memory for supporting HDTV comprises a resolution of 1920 pixels by 1080 lines. Accordingly, one line of storage would comprise 1920 words×16 bits, in order to implement dual port RAM (or 960 words by 32 bits if single port RAM is used). Sixteen bits is allocated for each word because five bits each are allocated for the quantization error in corresponding red, green and blue pixels. Thus, a word of 16 bits (being the nearest power of two) is selected as the size of the quantization error data that gets stored into the line buffer (or delay).

As shown in the FIG. 2, five adders are arranged in series (starting from an adder comprised by shift- and add-based multiplier 256). The arrangement of the adders in series often results in timing violation at higher operating frequencies. Furthermore, register pipelining (used to solve timing violations in the feedback path) can alter the transfer function relationship from input to output.

Figure 3:
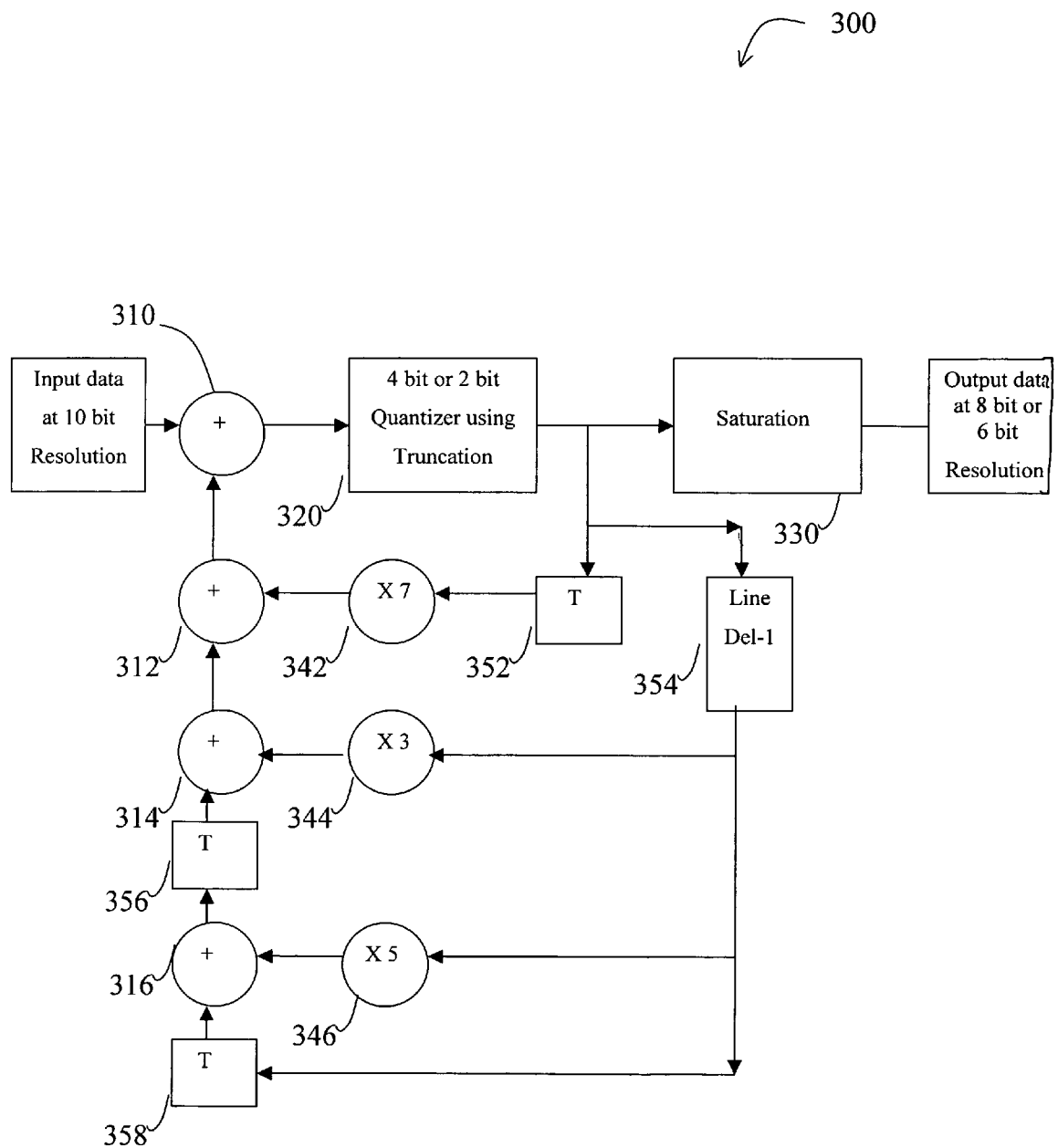
FIG. 3 is a block diagram of a two-dimensional Floyd Steinberg filter in transposed form in accordance with the present invention.

FIG. 3 is block diagram of a two-dimensional Floyd Steinberg filter in transposed form in accordance with the present invention. Transposed quantization filter 300 comprises quantizer 320, saturation logic 330, summing nodes 310, 312, 314, 316, shift- and add-based multipliers 342, 344, 346, unit delays 352, 356, 358, and line delay 354.

In the example of transposed architectural form, the delay elements of the filter have been arranged to break long combinational adder paths. The arrangement of delay elements is accomplished without affecting the transfer function of the filter. With this architecture the number of adders in the timing critical path has been reduced from five in direct form to four adders in the transposed form. The reduction in the number of adders in the timing critical path reduces the length of the timing critical path. The reduced length of the timing critical path increases the maximum speed at which the circuit operates.

Figure 4:
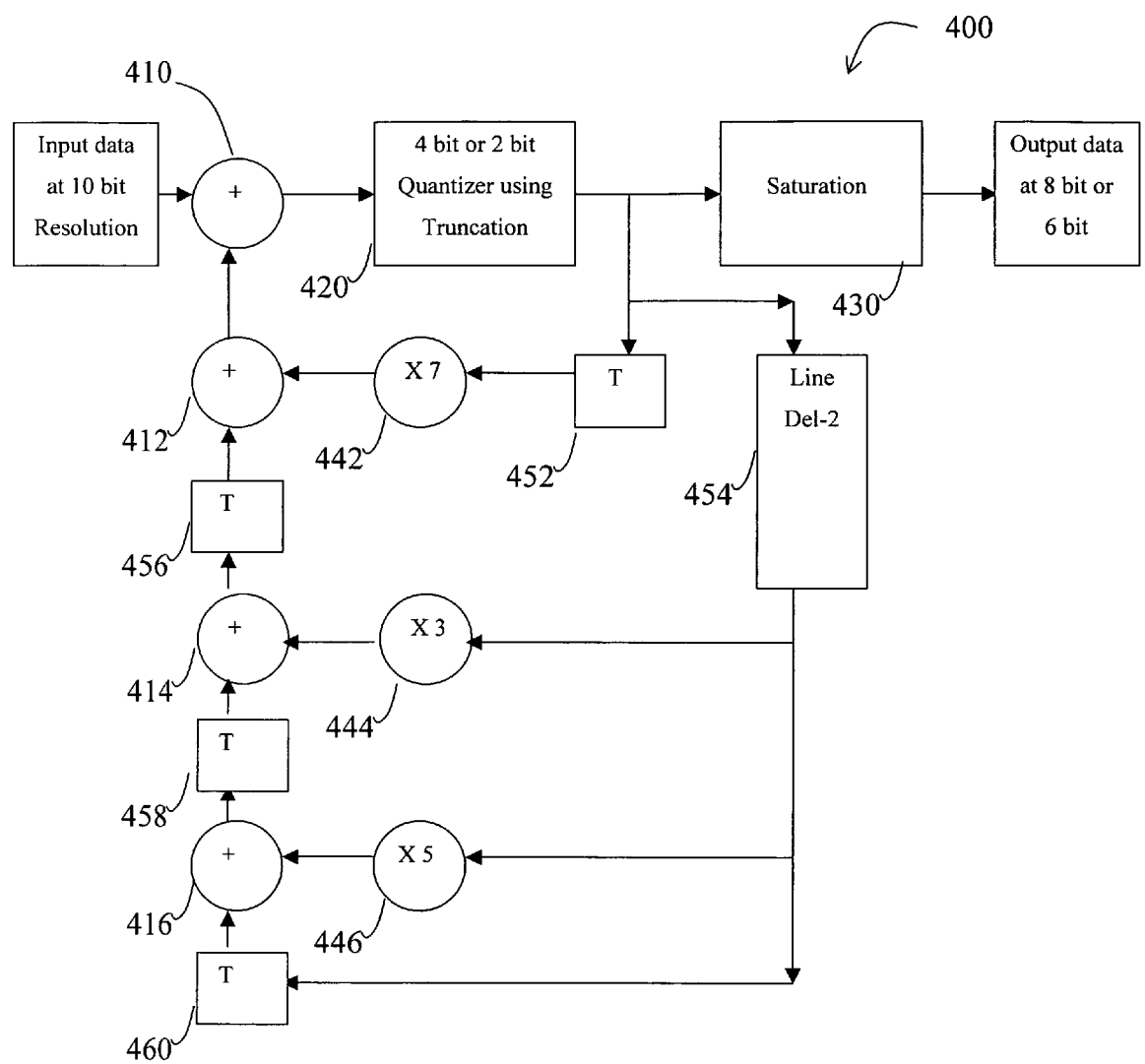
FIG. 4 is a block diagram of a two-dimensional Floyd Steinberg filter in modified transposed form in accordance with the present invention.

FIG. 4 is a block diagram of a two-dimensional Floyd Steinberg filter in modified transposed form in accordance with the present invention. Quantization filter 400 comprises quantizer 420, saturation logic 430, summing nodes 410, 412, 414, 416, shift- and add-based multipliers 442, 444, 446, unit delays 452, 456, 458, 460, and line delay 454.

High-speed operation and low-area implementations are achieved by deriving a pipeline stage from memory and propagating it in the feedback path. The series of sequential adders of FIG. 3 has been further reduced to three adders in series. The amount of error data storage implemented is still 1920 words by 16 bits, but in order to meet the timing constraints, data is derived (e.g., "clocked out") two clocks earlier from the memory. In FIGS. 2 and 3, data was clocked out only one clock earlier. Deriving the error values two clock earlier enables an additional pipeline stage to be included in the error diffusion filter data-path.

This substitution of an additional pipeline stage in the filter data-path allows a reduction in the series adder path from four adders (including the adders in the multiplication units of the multipliers) in FIG. 3 to three adders in FIG. 4, which contributes to making the design to be able to work at even higher frequencies. The presence of inactive time in every line of video data allows sufficient time to derive the error data two clocks earlier from the line delay memory.

With the modified pipeline arrangement, the modified transposed architecture is able to operate at 208 MHz. As shown in FIG. 4, the modified transposed architecture comprises only three adders in series (between any two unit delays) in the data path, which reduces the time critical path, and allows the architecture to operate at 208 MHz.

The design was synthesized using 0.18μ digital cell library. The clock frequency used for synthesis is 208 MHz (i.e., with a clock period of 4.8 ns).

TABLE 1

Summary of synthesis results

| Architecture | Timing | Slack | Combinational Area | Non-Combinational Area | Total Gate Count |
|---|---|---|---|---|---|
| Direct form | Violated | −1.63 | 2439 | 671 | 3111 |
| Transposed form | Violated | −0.68 | 2334 | 761 | 3096 |
| Modified Transposed Form | Met | 0.00 | 1791 | 921 | 2712 |

From the example synthesis results shown in Table 1, it is apparent that the direct form does not meet a timing specification of 208 MHz (the maximum frequency at which the direct form architecture can work is 155 MHz). The transposed form of the Floyd Steinberg two-dimensional architecture operates at higher frequencies and can run up to maximum of 182 MHz. The modified transposed form meets the timing specification of 208 MHz. The pre-layout synthesis result of 208 MHz provides a margin of error in the design specifications such that actual (silicon) implementations should exceed a manufacturing specification of 200 MHz. From the gate count column in the table it is also apparent that this improvement in timing can be obtained without significant additional overhead in silicon area.

Various embodiments of the invention are possible without departing from the spirit and scope of the invention. The above specification, examples and data provide a complete description of the manufacture and use of the composition of the invention. For example, the architecture can be implemented using hardware, software, or a combination of both. Since many embodiments of the invention can be made without departing from the spirit and scope of the invention, the invention resides in the claims hereinafter appended.

I claim:

1. A method for dithering, comprising:
   receiving a digital image signal, wherein the digital image signal comprises lines of pixel data, wherein each pixel comprises at least one word;
   reducing the number of bits in words in the digital video signal with a quantizer such that quantized words are formed;
   buffering lines of the quantized words in a memory;
   filtering the digital image signal by providing a feedback path to a filter that contemporaneously receives quantized words from the quantizer and quantized words from the memory; and
   providing the filtered digital image signal to an output device.

2. The method of claim 1, wherein the memory uses single-ported RAM cells.

3. The method of claim 2, wherein two sequentially quantized words are stored simultaneously in a same memory address during a first pixel clock transition and two sequential quantized words are read simultaneously from the same memory address during a second pixel clock transition that is after the first pixel clock transition.

4. The method of claim 1, wherein digital image signal is a digital video signal.

5. The method of claim 1, wherein the number of bits in words of the digital image signal are reduced by truncating at least one of the least significant bits.

6. The method of claim 1, wherein a horizontal data enable signal is used to read and write quantization error values into the memory.

7. The method of claim 1, wherein the filtering of the digital image signal filters pixels at a rate of over 200 MHz.

8. The method of claim 1, wherein the feedback path comprises a first pipeline having data clocked from the quantizer by a pixel clock at a present clocking time, and a second pipeline having data clocked from the memory, wherein the memory produces data that has been stored at a previous time, wherein the previous time is at least two clocks before the present clocking time of the pixel clock.

9. A pixel dithering system, comprising:
   a quantizer that is configured to reduce the number of bits in words of a digital video signal such that quantized words are formed, wherein the quantized words are associated with video lines of the digital video signal;
   a memory delay unit that is configured to receive the quantized words and to output the received quantized words after a time interval that is at least as long as the duration of two sequential pixel clocks; and
   a filter that is configured to receive quantized words that are associated with a present video line, to receive delayed quantized words from the memory delay unit, and to filter the received quantized words and the received delayed quantized words such that quantization artifacts in the digital video signal are reduced.

10. The system of claim 9, wherein the quantizer truncates an even number of bits from words of the digital video signal.

11. The system of claim 9, wherein the delay unit stores two quantized words at the same time during a first transition of a pixel clock and fetches two stored quantized words during a second transition of the pixel clock, wherein the second transition of the pixel clock is exactly one pixel clock cycle after the first transition.

12. The system of claim 11, wherein pixel clock operates at frequencies greater than around 200 MHz.

13. The system of claim 9, wherein the filter is further configured to output the digital video signal to a display.

14. The system of claim 9, wherein the filter comprises no more than three adders arranged sequentially between any two delay units of the filter, wherein each adder is one of an adder unit and a multiplication/adder unit.

15. A pixel dithering system, comprising:
   means for receiving a digital image signal, wherein the digital image signal comprises lines of pixel data, wherein each pixel comprises at least one word;
   means for reducing the number of bits in words in the digital video signal such that quantized words are formed;
   means for buffering lines of the quantized words;
   means for filtering the digital image signal by providing a feedback path that contemporaneously receives quantized words from the quantizer and quantized words from the memory; and
   means for outputting the filtered digital image signal.

16. The system of claim 15, wherein means for reducing the number of bits in words in the digital video signal truncates the four lowest order bit of the words in the digital video signal.

17. The system of claim 15, wherein the means for filtering the digital image signal does not contain more than three adders in series within a timing critical path, wherein each adder is one of an adder unit and a multiplication/adder unit.

18. The system of claim 15, wherein the means for filtering operates at frequencies greater than around 200 MHz.

19. The system of claim 15, wherein the means for outputting the filtered digital image signal comprises a video display.

20. The system of claim 15, wherein the feedback path comprises a first pipeline having data clocked from the quantizer by a pixel clock at a present clocking time, and a second pipeline having data clocked from the memory, wherein the memory produces data that has been stored at a previous time, wherein the previous time is at least two clocks before the present clocking time of the pixel clock.

* * * * *